(No Model.)
P. KILTZ.
SPRING WEIGHING SCALE.
No. 454,052. Patented June 16, 1891.
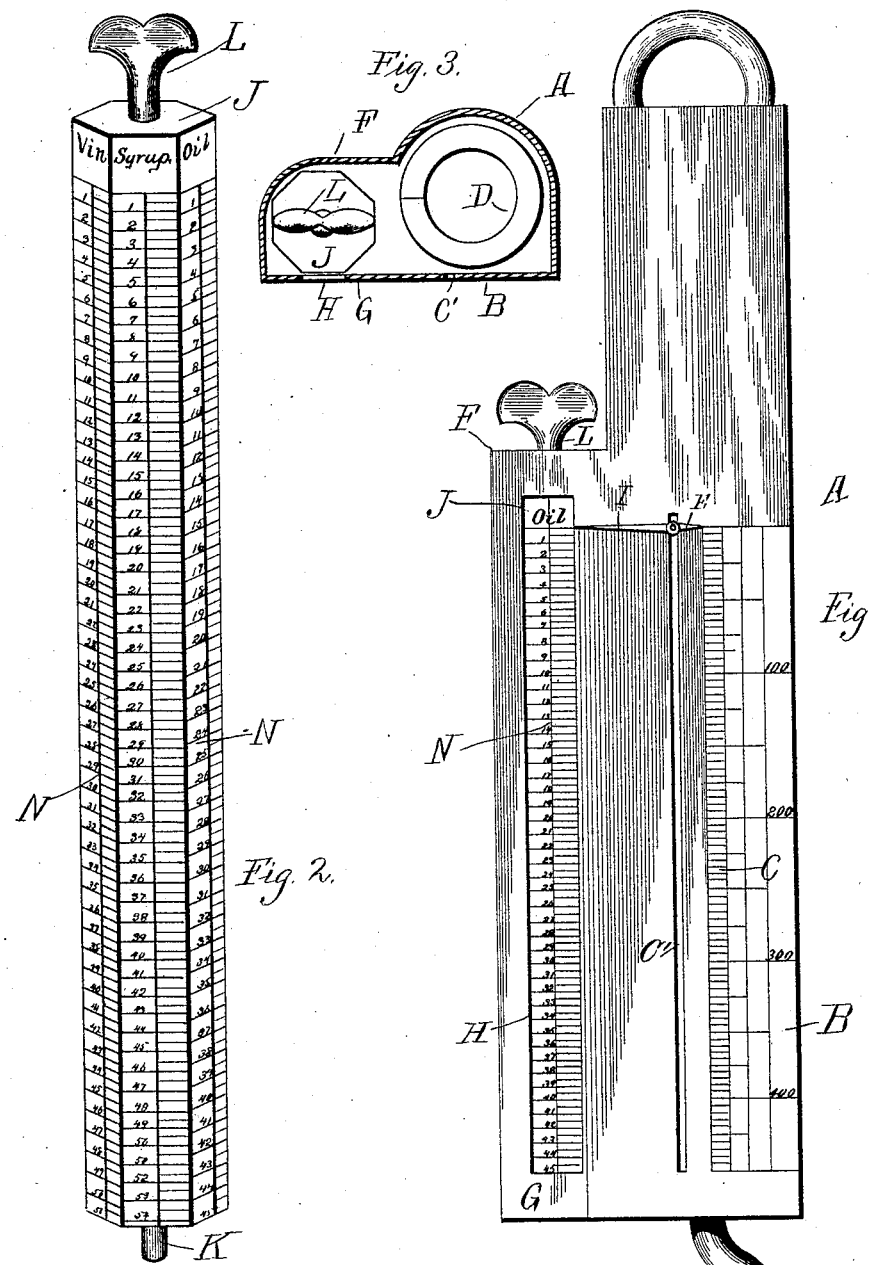

UNITED STATES PATENT OFFICE.

PETER KILTZ, OF RICH HILL, MISSOURI.

SPRING WEIGHING-SCALE.

SPECIFICATION forming part of Letters Patent No. 454,052, dated June 16, 1891.

Application filed August 2, 1890. Serial No. 360,797. (No model.)

*To all whom it may concern:*

Be it known that I, PETER KILTZ, a citizen of the United States, residing at Rich Hill, in the county of Bates and State of Missouri, have invented certain new and useful Improvements in Spring Weighing-Scales; and I do hereby declare the following to be a full, clear, and exact description of the invention, such as will enable others skilled in the art to which it appertains to make and use the same.

This invention relates to spring weighing-scales for use in weighing standard articles, such as flour, feed, &c., and sirups, oils, lard, and the like; and my object is to produce a simple, cheap, and easily-operated device to be used in connection with an ordinary pair of scales, whereby the quantity of the matter being weighed as well as the weight of the same is obtained without extra time or trouble, and by simple adjustment of the device the measurement of commodities having different standard weights is registered by the same indicator.

With these ends in view my invention consists in the peculiarities of construction and combination of parts more fully described hereinafter, and pointed out in the claims.

Referring to the accompanying drawings, Figure 1 represents a front view of my device; Fig. 2, a detail view of the octagonal dial or scale, and Fig. 3 a top view with the top of the casing removed.

The reference-letter A indicates the outside casing of an ordinary pair of spring-scales having a hook at the bottom and a ring at the top, and its front face B is provided with the usual vertical scale C, indicating pounds and fractions thereof, along the side of which extends a slot C'. A heavy coil-spring D is arranged inside the case A and is connected at one end to an indicator E, which extends through the slot C'.

While I prefer to use this form of scale as being very simple, yet it is evident that many other varieties might be employed in the same manner and with equal results.

On one side of the case A is formed an auxiliary casing F, integral therewith and having its front face G forming one plain flat surface with the face B of the main case. The face G is provided down its center with a vertical slot or opening H, and a finger I extends from the indicator E in an opposite direction to the finger which registers the weight and to the edge of the opening H, as seen in Fig. 1. Inside the case F is fitted an octagonal stick or bar J, provided on its lower end with a short trunnion K, fitting in suitable bearings in the base of said case, and on its upper end with a thumb-piece L, extending through the upper end of the case and forming the bearing at this end. On each of the faces of the bar J is marked a scale N, denoting in standard numbers the quantity of the commodity designated at the top of the scale in proportion to the weight of the same.

The opening H is of such dimensions as to expose one face of the dial J, showing the scale and name at the top, and said dial can be readily turned to show its different sides through this opening by manipulating the thumb-piece L.

The operation of the device will be apparent, for if, for instance, oil is being weighed the octagonal bar will be turned until the side bearing the word "Oil" at the top shows through the opening H, when the barrel or other receptacle containing the oil is attached to the scale-hook and the weight obtained in the usual manner, while at the same time the rearwardly-extending finger I of the indicator E runs down the oil-scale on the face of the bar J and denotes the quantity of the oil being weighed.

It will be understood that these scales will be arranged according to the standard proportionate weights and measures, and that the weight of the barrel is taken into consideration, so that an accurate result will be obtained.

It will of course be evident that my device might be applied on a scale arranged beneath a grain-hopper in the same manner and in many other similar places, and hence I do not wish to confine myself to the precise construction and arrangement shown.

Having thus described my invention, what I claim as new, and desire to secure by Letters Patent, is—

1. In combination with a pair of spring weighing-scales, a separate scale denoting quantity and so arranged that the indicator of the weighing-scales also automatically registers the quantity of the commodity on said quantity-scale, whereby the measurement is obtained in proportion to the weight, as set forth.

2. The combination, with a pair of spring weighing-scales having a vertically-movable positively-actuated indicator and a vertical scale, of a separate scale denoting quantity and arranged parallel with said weight-scale, and a finger or pointer extending from said indicator to said quantity-scale, substantially as and for the purpose described.

3. In combination with a pair of spring weighing-scales, a polygonal scale alongside thereof, having different measurements marked on its different sides to denote the quantity of various commodities in proportion to their weights, as set forth.

4. The combination, with a pair of spring weighing-scales, of a polygonal bar alongside thereof inclosed in a suitable case having an opening in its front, said bar being provided on its different faces with scales denoting the measurement of various commodities in proportion to their weights, and also adapted to be rotated in said inclosing case to expose its different sides through the opening in the latter, and an automatically-operated pointer extending from the weight-scale indicator to the opening in the case in front of the polygonal bar to register with the quantity-scale, as set forth.

In testimony whereof I affix my signature in presence of two witnesses.

PETER KILTZ.

Witnesses:
W. D. STONEBROKER,
J. D. MOORE.